E. WICKS.
Seed Dropper.
No. 8,728.
Patented Feb. 10, 1852.
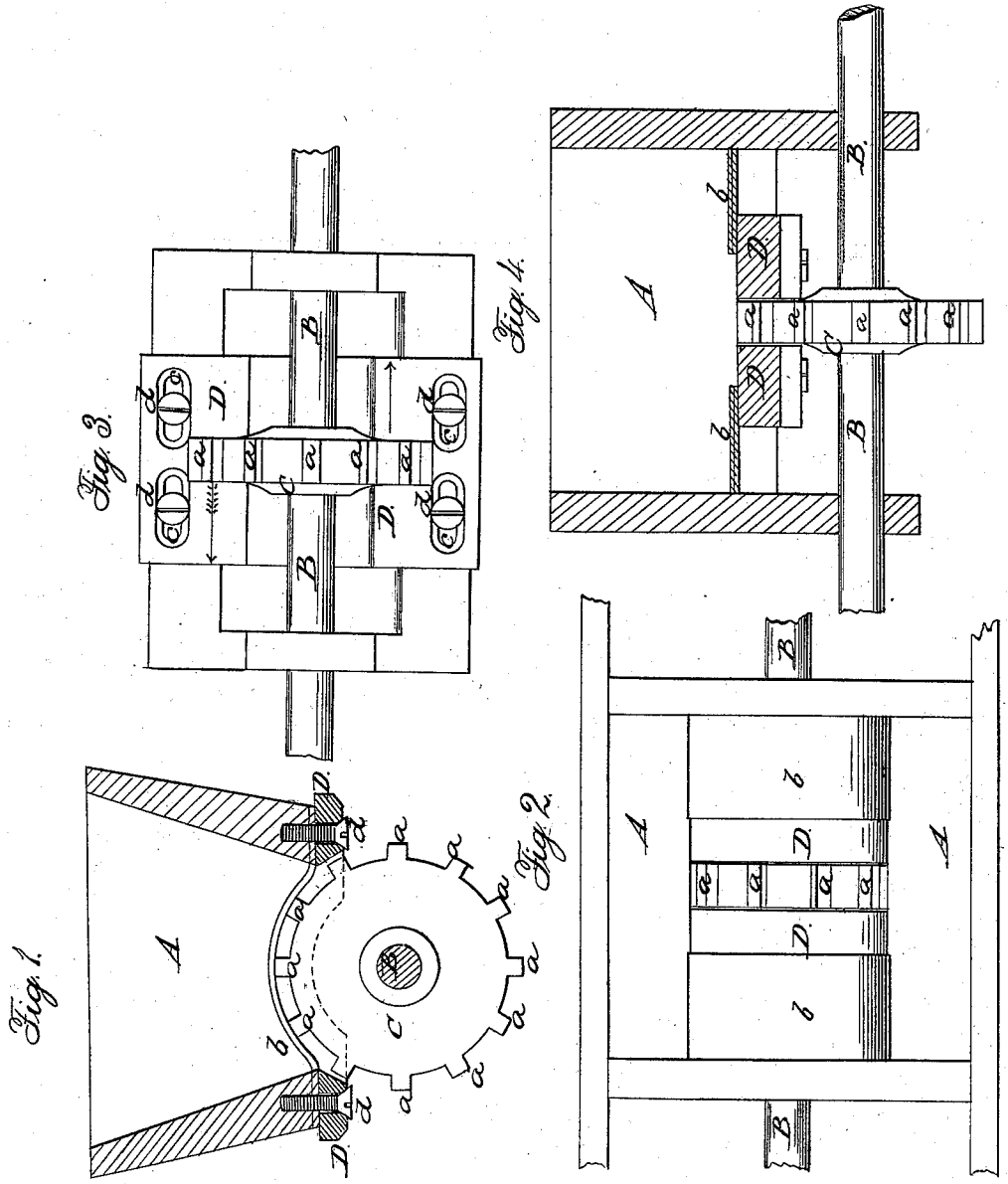

UNITED STATES PATENT OFFICE.

EDWARD WICKS, OF BART, PENNSYLVANIA.

IMPROVEMENT IN SEED-PLANTERS.

Specification forming part of Letters Patent No. 8,728, dated February 10, 1852.

*To all whom it may concern:*

Be it known that I, EDWARD WICKS, of Bart, in the county of Lancaster and State of Pennsylvania, have invented a certain new and useful Improvement in Seed-Planters; and I do hereby declare that the following is a full, clear, and exact description of the construction and operation of the same, reference being had to the accompanying drawings, forming part of this specification, in which—

Figure 1 is a vertical section taken longitudinally of the seed-planter and exhibiting the distributing mechanism constituting my improvement. Fig. 2 is a regular plan or top view of the same; Fig. 3, an inverted plan or under view of same. Fig. 4 is a vertical section taken transversely through the machine.

The same letters of reference indicate corresponding parts throughout the several figures.

My invention consists in so constructing the several distributing-wheels with movable adjuncts or slides, through which the supply is received by the wheels, as that any lateral motion or play of the carrying-shaft will not be attendant with the usual friction or impeding contact that the distributing-wheels now are subject to upon the sides of the apertures through which the grain is fed.

To enable others skilled in the art to make and use my invention, I will proceed to describe its construction and operation.

A is one of the hoppers or compartments composing the seed-trough.

B is the carrying-shaft, on which the draft and distributing wheels are hung. Any number of such hoppers and distributing-wheels arranged in succession side by side, as at present, may be used, and the ordinary attachments of funnels and other devices appertaining to seed-planters are intended to be employed. It is, however, only necessary here to refer minutely to the part represented and specified to which my improvement relates, the following description of the one distributing-wheel and its accompanying devices being explanatory of the several similar and adjoining arrangements.

C is a distributing-wheel for feeding in the grain from the hopper to the planting-funnel. Its form is somewhat similar to those in present use; but instead of the periphery being furnished with the ordinary indentations or notches (to receive the kernel) which perform their office smoothly as regards any disturbance of the mass, it is made with abrupt projections or cogs *a a*, which not only answer to convey the kernel in between them, but also to agitate without bruising the whole body of grain in the hopper, and thereby prevent clogging, the wheel being suitably fitted to its adjuncts and situated in relation to the hopper for the production of this effect, as will appear from the continued description. The wheel C, constructed as specified, is keyed or otherwise made fast to the carrying or propelling shaft B. It projects into the hopper A, so that the outer surface of the cogs are on a level, or thereabout, with the pieces *b b*, forming the grate of the hopper, and which, having a space between them wherein the distributing-wheel works, are made of a curve whose center is that of the propelling-shaft, whereby, the sides of the hopper being lower than the elevation to which the periphery of the wheel projects and the highest point or line of the pieces *b b*, the grain is caused to cover a large portion of the periphery of the wheel C, or, in other words, the wheel made to project into the body of the grain, and by the cogs, as and for the purpose specified, agitate the mass.

D is a slide or covering-plate to the space between the pieces *b b*, forming the grate of the hopper. It is situated, as it were, under the bottom of the hopper, and enters the interior thereof in like manner to and to the same extent as do the cogs of the wheel C, which, through means of an oblong slot in the plate D, passes and works through the latter, that on either side form sides to the spaces between the cogs receiving the grain, the curve of the upper surface of the plate D corresponding to the periphery of the cogs, so that the kernel-receiving spaces will be of the same depth as the cogs. Thus it will be seen the wheel C is made to enter the hopper, and, when revolving, to agitate the mass without bruising the kernel, which it conveys to the planting-funnel in the usual manner. The plate D, as aforesaid, is a slide, the object and operation of which will now be explained. It is constructed, as more clearly represented in Fig. 3, with oblong slots *c c c c*, that, through means of the guides or projections *d d d d*, admit of the plate D sliding either way in direction of the length of the shaft B, as indicated by arrows in Fig. 3. The object of this arrangement is to avoid friction of the sides of the distributing-wheel upon the sides of the opening where communicating with the hopper, which friction at present is considerable, (it being remembered the number of distributing-wheels that are at work,) and which is produced by the play lengthwise that the shaft B, through wear of its bearings, is made to possess, such play occurring whenever the machine is raised on either side by inequality of traveling surface, or through other cause, the said play causing the distributing-wheels to rub on the sides of the apertures communicating with the hoppers; but where a slide, D, is used the friction is avoided, as the wheel C, bearing on the sides of the opening in the plate D, will cause it (the latter) to yield, as indicated by arrows, Fig. 3.

I do not claim exclusively causing the distributing-wheel (constructed with cogs or teeth, as described) to enter the body of the hopper, as such has already been done; but What I do claim as my invention, and desire to secure by Letters Patent, is—

The employment of a slide, D, or its equivalent, through which the distributing-wheel works, and that, by being movable, operates to avoid friction of the wheel upon the sides of the aperture, communicating with the hopper, as liable to be produced by the play of the shaft upon which the distributing-wheel C is hung, essentially as herein represented and specified.

In testimony whereof I have hereunto signed my name before two subscribing witnesses.

EDWARD WICKS.

Witnesses:
  WM. P. ELLIOT,
  I. F. PINCKNER.